(12) United States Patent
Takao et al.

(10) Patent No.: US 7,533,903 B2
(45) Date of Patent: May 19, 2009

(54) SEAT BELT APPARATUS

(75) Inventors: Masato Takao, Tokyo (JP); Koji Tanaka, Tokyo (JP); Koji Inuzuka, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/498,143

(22) Filed: Aug. 3, 2006

(65) Prior Publication Data
US 2007/0029772 A1  Feb. 8, 2007

(30) Foreign Application Priority Data
Aug. 5, 2005  (JP) .............................. 2005-228610

(51) Int. Cl.
*B60R 22/34* (2006.01)

(52) U.S. Cl. .................... 280/807; 242/374; 242/390.8; 242/390.9

(58) Field of Classification Search ................ 180/268; 280/806, 807, 808; 242/372, 374, 382, 390.8, 242/390.9
See application file for complete search history.

(56) References Cited

U.S. PATENT DOCUMENTS

| | | | |
|---|---|---|---|
| 5,558,370 A * | 9/1996 | Behr ........................... | 280/806 |
| 5,788,281 A | 8/1998 | Yanagi et al. | |
| 5,960,523 A * | 10/1999 | Husby et al. ................... | 24/633 |
| 6,616,186 B1 * | 9/2003 | Midorikawa et al. ..... | 280/801.1 |
| 6,726,249 B2 * | 4/2004 | Yano et al. ................... | 280/805 |
| 6,961,045 B2 * | 11/2005 | Tsao ........................... | 345/103 |
| 7,059,444 B2 * | 6/2006 | Kachu ......................... | 180/268 |
| 7,080,800 B2 * | 7/2006 | Fujii et al. ............... | 242/390.9 |
| 2005/0011983 A1 | 1/2005 | Inuzuka et al. | |
| 2006/0220368 A1 | 10/2006 | Takao et al. | |
| 2006/0231664 A1 | 10/2006 | Takao et al. | |
| 2006/0237570 A1 | 10/2006 | Takao et al. | |

FOREIGN PATENT DOCUMENTS

| | | |
|---|---|---|
| DE | 196 36 448 | 4/1997 |
| EP | 1 498 326 | 1/2005 |
| EP | 1 707 455 | 10/2006 |
| EP | 1 712 435 | 10/2006 |
| JP | 6-71333 | 10/1994 |

OTHER PUBLICATIONS

Bill Drury, The Control Techniques Drives and Controls Handbook, Institution of Engineering and Technology, Chapter 4, Section 1.*

* cited by examiner

*Primary Examiner*—John Q. Nguyen
*Assistant Examiner*—Joseph Rocca
(74) *Attorney, Agent, or Firm*—Foley & Lardner LLP

(57) ABSTRACT

A seat belt retractor, which is capable of winding and unwinding a seat belt for occupant restraint by an electric motor, warns a vehicle occupant. A seat belt retractor of a seat belt apparatus to be installed in a vehicle is structured such that a motor is controlled to repeat an action of increasing and decreasing the tension acting on a seat belt a plurality of times according to a setting that the seat belt tension at the initial stage of each action overshoots a predetermined target tension, for the purpose of warning a vehicle occupant who wears the seat belt.

18 Claims, 9 Drawing Sheets

FIG. 4(A)
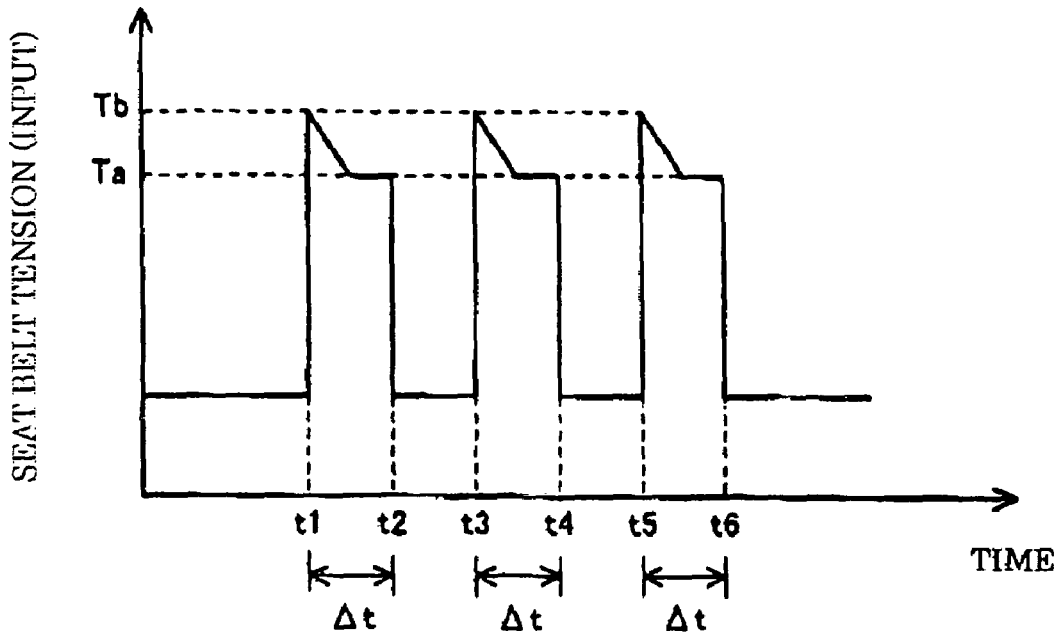
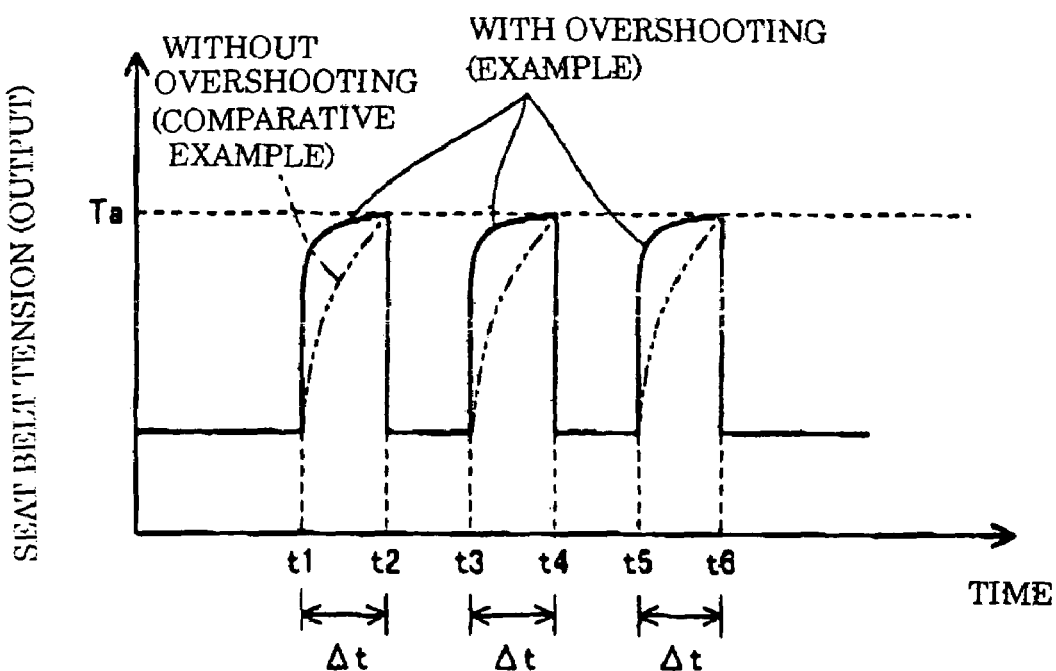
FIG. 4(B)

FIG. 6(A)
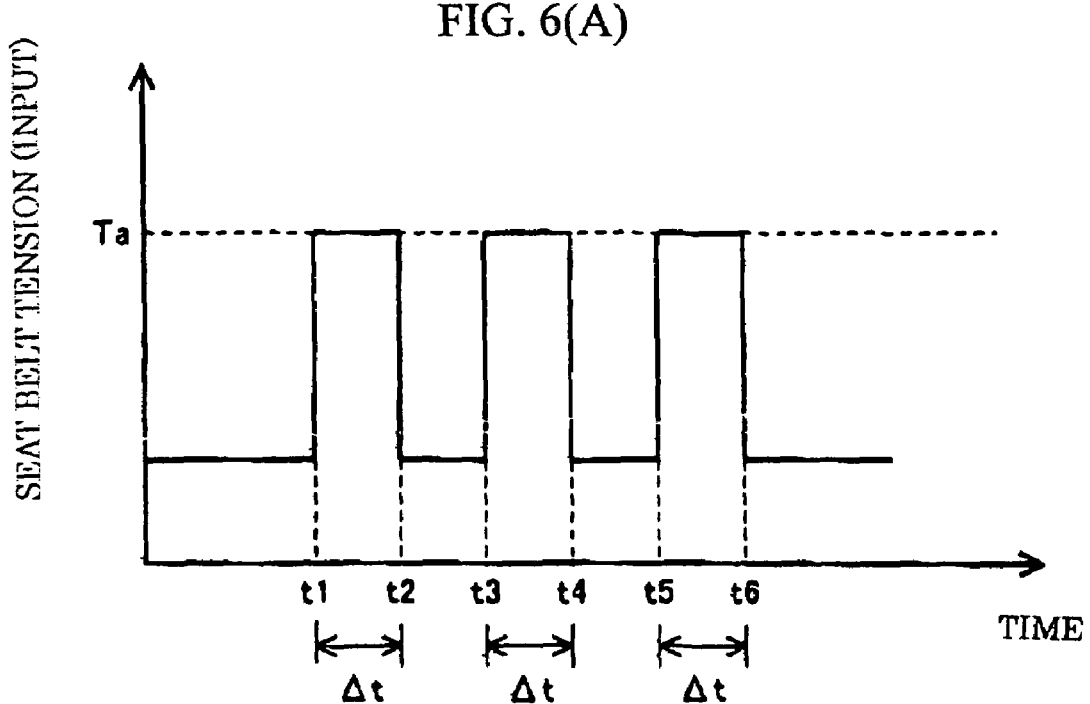
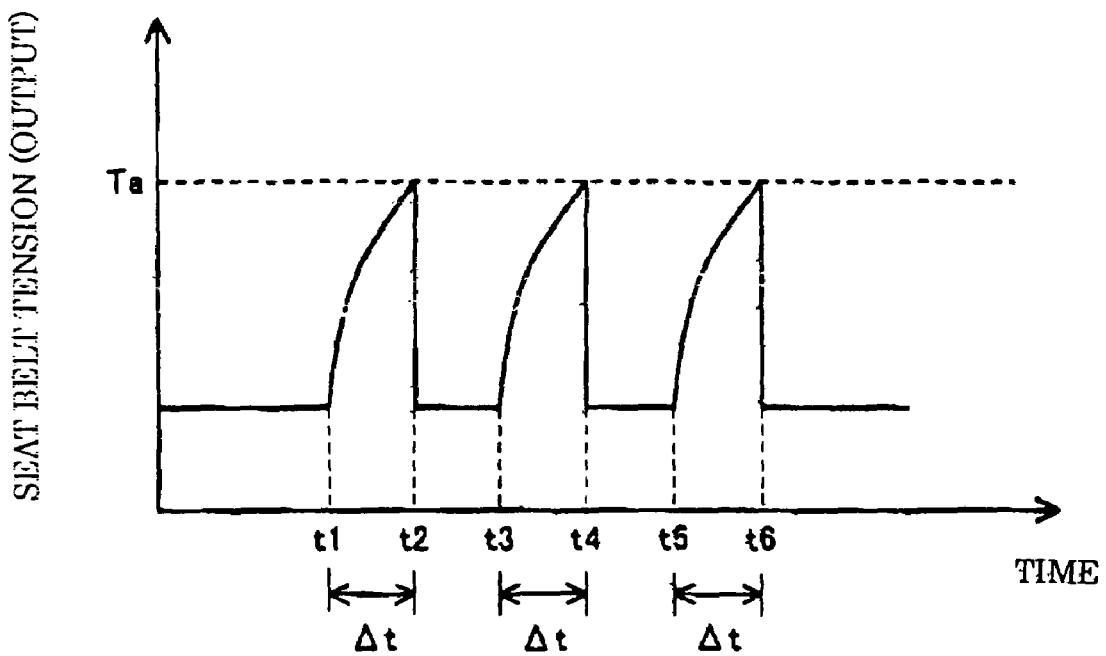
FIG. 6(B)

FIG. 8(A)
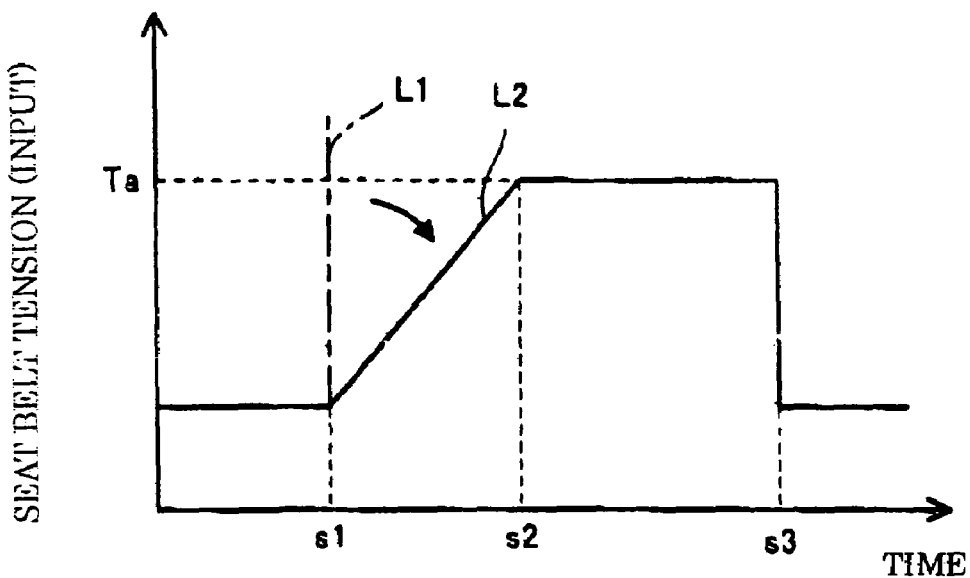
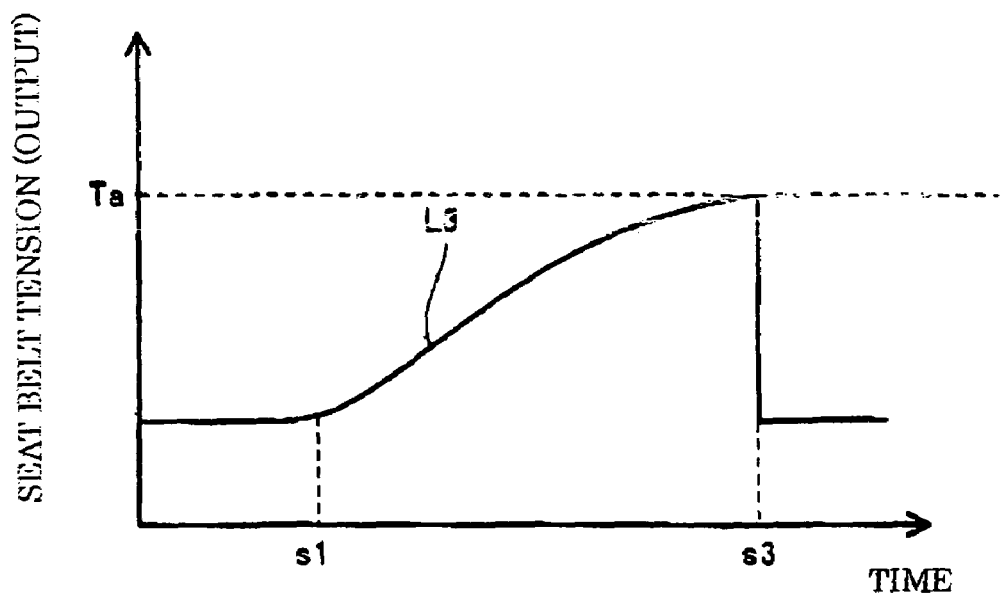
FIG. 8(B)

SEAT BELT APPARATUS

BACKGROUND

The present invention relates to a technology for developing a seat belt retractor to be installed in a vehicle.

Conventionally, seat belt apparatuses of various structures for restraining an occupant in a vehicle by a seat belt are known.

Japanese Unexamined Utility Model Publication No. H06-71333 ("JP Pub. No. '333"), which is incorporated by reference herein in its entirety, discloses a structure of a seat belt apparatus capable of winding and unwinding a seat belt by the driving of a motor or the like. With the technology disclosed in JP Pub. No. '333, a seat belt retractor employs a structure in which the winding and unwinding of the seat belt onto a spool is conducted by a motor and a structure in which the tension on the seat belt is intermittently changed so as to change the restraining force by the action of the motor, thereby warning a driver about the possibility of a vehicle collision.

SUMMARY

One embodiment of the invention relates to a seat belt retractor to be installed in a vehicle. The retractor comprises an electric motor; a spool which is capable of winding and unwinding a seat belt for occupant restraint according to the driving of the electric motor; and a control mechanism for controlling the electric motor. The control mechanism performs a control mode in which the electric motor is controlled to repeat an action of increasing and decreasing the tension acting on the seat belt via the spool a plurality of times according to a setting that the seat belt tension at the initial stage of each action overshoots a predetermined target tension to warn a vehicle occupant wearing the seat belt.

Another embodiment of the invention relates to a seat belt apparatus to be installed in a vehicle. The apparatus comprises a seat belt for occupant restraint which can be worn by a vehicle occupant; an electric motor; a spool which is capable of winding and unwinding the seat belt according to the driving of the electric motor; a control mechanism to control the electric motor; a buckle fixed to the vehicle; a tongue which is attached to the seat belt and is latched to the buckle when the seat belt is worn; and a detection sensor for detecting that the tongue is latched to the buckle. The detection sensor detects that the seat belt is worn by the vehicle occupant, the control mechanism performs a control mode in which the electric motor is controlled to repeat an action of increasing and decreasing the tension acting on the seat belt via the spool a plurality of times according to a setting that the tension at the initial stage of each action overshoots a predetermined target tension to warn the vehicle occupant.

Another embodiment of the invention relates to a vehicle. The vehicle comprises an accommodating space; and seat belt apparatus accommodated in the accommodating space. The seat belt apparatus includes a seat belt for occupant restraint which can be worn by a vehicle occupant; an electric motor; a spool which is capable of winding and unwinding the seat belt according to the driving of the electric motor; a control mechanism to control the electric motor; a buckle fixed to the vehicle; a tongue which is attached to the seat belt and is latched to the buckle when the seat belt is worn; and a detection sensor for detecting that the tongue is latched to the buckle. The detection sensor detects that the seat belt is worn by the vehicle occupant, the control mechanism performs a control mode in which the electric motor is controlled to repeat an action of increasing and decreasing the tension acting on the seat belt via the spool a plurality of times according to a setting that the tension at the initial stage of each action overshoots a predetermined target tension to warn the vehicle occupant.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 4($a$) and 4($b$) are graphs showing changes with time in seat belt tension actually acting on a vehicle occupant set according to an embodiment relating to the seat belt winding control shown in FIG. 3, in which FIG. 4($a$) illustrates input seat belt tension and FIG. 4($b$) illustrates output seat belt tension.

FIGS. 6($a$) and 6($b$) are graphs showing changes with time in seat belt tension actually acting on a vehicle occupant set according to a comparative example of the warning control process, in which FIG. 6($a$) illustrates input seat belt tension and FIG. 6($b$) illustrates output seat belt tension.

FIGS. 8($a$) and 8($b$) are graphs showing changes with time in seat belt tension actually acting on the vehicle occupant set according to the embodiment relating to the seat belt winding control shown in FIG. 7, in which FIG. 8($a$) illustrates input seat belt tension and FIG. 8($b$) illustrates output seat belt tension.

DETAILED DESCRIPTION

Figure 1:
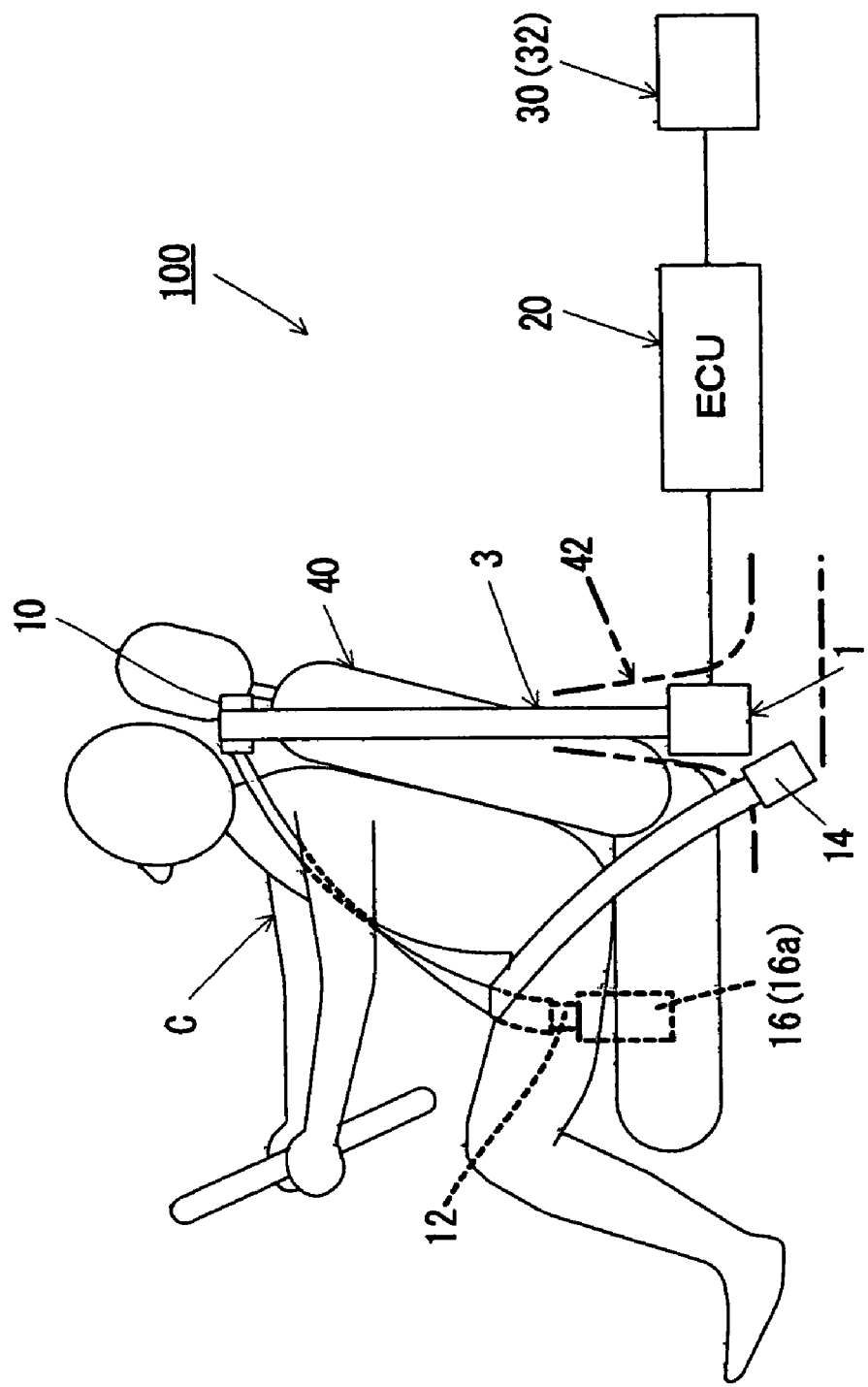
FIG. 1 is an illustration showing the structure of a seat belt apparatus of an embodiment of the present invention.

In order to warn a vehicle occupant about the possibility of a vehicle collision by use of a seat belt apparatus as disclosed in the aforementioned JP Pub. No. '333, a motor control may be employed in which a motor is controlled to repeat an action of increasing the tension acting on a seat belt to a predetermined target value and then reducing the tension several times at regular time intervals.

Though the aforementioned control enables a vehicle occupant to be warned, it is difficult to conduct this motor control to exactly bring the seat belt tension actually acting on the vehicle occupant close to the predetermined target value. If a control for simply increasing the preset value of the seat belt tension is employed in order to ensure that the vehicle occupant is informed of the warning by the seat belt, only restraining feeling of the vehicle occupant caused by the seat belt must be increased. On the other hand, if a control for simply decreasing the preset value of the seat belt tension is employed, the restraining feeling caused by the seat belt can be reduced, but the absolute seat belt tension will be insufficient so as to degrade the recognizability of warning.

It is an object of the present invention to provide a technology for controlling a seat belt retractor, which is capable of winding and unwinding a seat belt for occupant restraint, by use of an electric motor and to therefore provide a technology effective for ensuring the warning to draw a vehicle occupant's attention.

Embodiments of the present invention can be typically adapted to a seat belt retractor to be installed in an automobile. In addition, embodiments of the present invention can be adapted to a technology for developing a seat belt retractor to be installed in a vehicle other than the automobile, such as aircraft, boat, train, bus and the like.

The seat belt retractor of a first embodiment is a device to be installed in a vehicle and comprises at least an electric motor, a spool, and a control mechanism.

The spool is a member which is operated according to the driving of the electric motor to wind or unwind a seat belt for occupant restraint. The seat belt for occupant restraint to be wound onto and unwound from the spool is a long belt to be worn by a vehicle occupant seated in a seat and is sometimes called "webbing". Typically, the vehicle occupant seated in the vehicle seat is restrained by the seat belt when restraint is required such as a vehicle collision. In the present embodiment, if required, a power transmission mechanism may be suitably disposed between the electric motor and the spool to selectively achieve a connected state where the electric motor and the spool are connected and a disconnected state where the connected state is cancelled.

The control mechanism is adapted at least as a mechanism for controlling the driving of the electric motor and controls the driving direction, the driving time, the output of the electric motor and the like. The control mechanism is typically composed of a CPU (central processing unit), an input/output unit, a storage unit, a peripheral unit, and the like. The control mechanism may be provided exclusively for the seat belt retractor or used not only for the seat belt retractor but also for other control mechanisms for controlling the driving system and/or electric system.

In embodiments of the present invention, the control mechanism performs a control mode in which the electric motor is controlled to repeat an action of increasing and decreasing the tension acting on the seat belt via the spool (temporarily increasing the tension) a plurality of times in order to surely warn a vehicle occupant (typically a driver) who wears the seat belt. By performing the control mode, warning is conducted to the vehicle occupant so as to draw the vehicle occupant's attention. Specifically, when it is determined that an obstacle (another vehicle, object, pedestrian or the like) exists within a predetermined range around the subject vehicle or that the subject vehicle is highly likely to collide with the obstacle, or when it is determined that the driver dozes, the warning is conducted. That is, the seat belt retractor has a function as a restraint mechanism for restraining the vehicle occupant by the seat belt and, in addition, a function as a warning mechanism (warning system) for warning the vehicle occupant by mechanism of the seat belt.

When the warning is conducted to the vehicle occupant by the winding action of the seat belt, it is difficult to exactly bring the seat belt tension actually acting on the vehicle occupant close to the target value preset in the motor control. If a control for simply increasing the preset value of the seat belt tension is employed in order to ensure that the vehicle occupant is informed of the warning by the seat belt, only restraining feeling of the vehicle occupant caused by the seat belt must be increased.

In embodiments of the present invention, therefore, the control mechanism is adapted to perform at least a control mode for controlling the electric motor to be driven according to such a setting that the tension at the initial stage of the action increasing and decreasing the tension acting on the seat belt overshoots the target tension. With regard to the overshoot, the curve indicating changes with time in the preset tension is adapted to have an extreme value, which slightly exceeds the target value, at the initial stage of each action. This control mode is achieved by changing the current value (sometimes referred to as "control current value") and/or the voltage value (sometimes referred to as "applied voltage value") of the electric motor to control the motor output so as to set the speed and/or acceleration of winding of the seat belt to desired level. The target tension may be previously set or set according to a result of judgment of the body size or the clothes of the vehicle occupant on a case-by-case basis.

Therefore, according to the aforementioned structure of the seat belt retractor as claimed in the first embodiment, the seat belt tension actually acting on the vehicle occupant can be rapidly increased to the target tension and, except the initial stage of each warning action, the restraining feeling caused by the seat belt can be prevented from being increased needlessly. Accordingly, it is capable of surely conducting the warning to draw the vehicle occupant's attention. Further, embodiments of the invention enable the warning by use of the seat belt easily without complicating the control.

The seat belt apparatus of a second embodiment is an apparatus to be installed in a vehicle and comprises at least a seat belt, an electric motor, a spool, a control mechanism, a buckle, a tongue, and a detection sensor.

The seat belt is a long belt to be worn by a vehicle occupant seated in a seat and is sometimes called "webbing". Typically, the vehicle occupant seated in the vehicle seat is restrained by the seat belt when restraint is required such as a vehicle collision. The buckle is a member fixed to the vehicle. The tongue is a member which is attached to the seat belt and is latched to the buckle when the seat belt is worn by the vehicle occupant. The detection sensor is a mechanism for detecting that the tongue is latched to the buckle. The electric motor, the spool, and the control mechanism of this embodiment have substantially the same functions as those of the seat belt retractor of the first embodiment.

That is, the seat belt apparatus of this embodiment has a function as a restraint mechanism for restraining the vehicle occupant by the seat belt and, in addition, a function as a warning mechanism (warning system) for warning the vehicle occupant by use of the seat belt. In this embodiment, the control mechanism is adapted to perform at least a control mode for controlling the electric motor to be driven according to such a setting that the tension at the initial stage of the action increasing and decreasing the tension acting on the seat belt overshoots a predetermined target tension.

Therefore, according to the aforementioned structure of the seat belt apparatus of the second embodiment, warning a vehicle occupant can be conducted by the seat belt.

The vehicle with a seat belt apparatus of a third embodiment comprises at least a seat belt apparatus as described in the second embodiment. In the vehicle of the embodiment, the seat belt apparatus is accommodated in an accommodating space in the vehicle such as an accommodating space in a pillar, an accommodating space in a seat, or an accommodating space in another part of the vehicle.

Accordingly, the third embodiment provides a vehicle in which a seat belt apparatus is accommodated in an accommodating space in the vehicle, wherein the seat belt apparatus can warn and draw the occupant's attention via the seat belt.

As described in the above, embodiments of the present invention relate to the structure of a seat belt system for winding or unwinding a seat belt for occupant restraint according to the driving of an electric motor and can control the electric motor to be driven according to such a setting that the tension at the initial stage of the action of increasing and decreasing the tension acting on the seat belt overshoots the predetermined target tension, thereby surely conducting the warning for drawing the vehicle occupant's attention.

Hereinafter, embodiments of the present invention will be described in detail with reference to drawings. First, description will be made as regard to an embodiment of the present invention with reference to FIG. 1 and FIG. 2.

Figure 2:
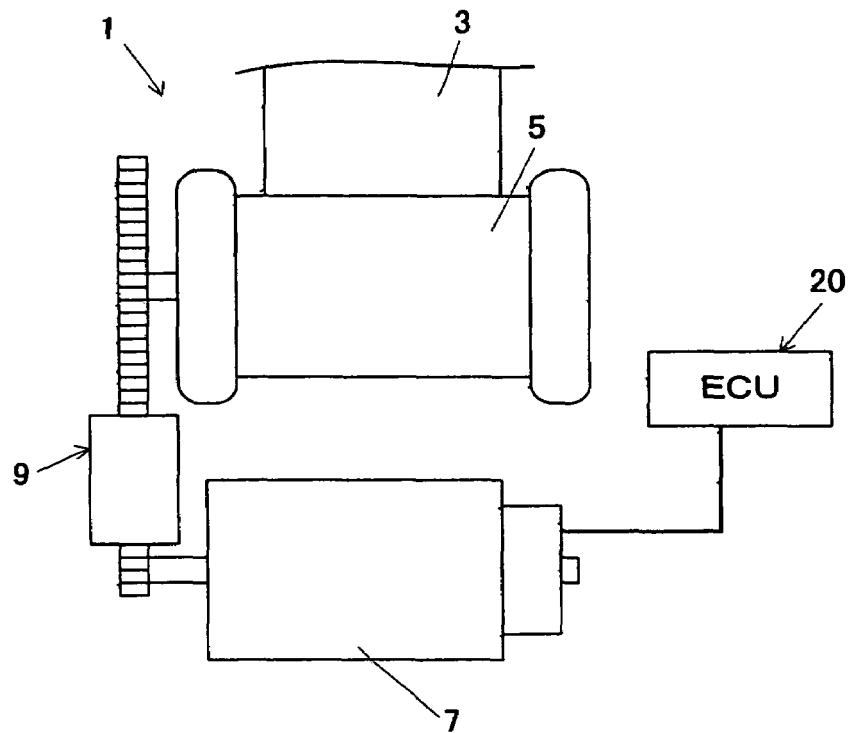
FIG. 2 is an illustration showing the schematic structure of a seat belt retractor shown in FIG. 1.

FIG. 1 is an illustration showing the structure of a seat belt apparatus 100 as an embodiment of "the seat belt apparatus" according to the present invention. FIG. 2 is an illustration showing the schematic structure of a seat belt retractor 1 shown in FIG. 1.

As shown in FIG. 1, the seat belt apparatus 100 of this embodiment is a seat belt apparatus for a vehicle to be installed in an automotive vehicle as "a vehicle with a seat belt apparatus" of the present invention and mainly consists of a seat belt retractor 1, a seat belt 3, a shoulder guide anchor 10, a tongue 12, an outer anchor 14, a buckle 16, an ECU 20 and the like. In addition, an input element 30 is installed in the vehicle to detect information about collision prediction or collision occurrence of the vehicle, information about the driving state of the vehicle, information about the sitting position and the body size of a vehicle occupant seated in a seat, information about traffic conditions around the vehicle, information about weather condition and about time zone, and the like and to input such detected information to the ECU 20. The detected information of the input element 30 is transmitted to the ECU 20 anytime or at predetermined intervals and is used for the operation control of the seat belt apparatus 100 and the like.

Particularly, the input element 30 of this embodiment includes a collision information detection sensor 32 for detecting information about a vehicle collision such as a prediction of a vehicle collision and an occurrence of actual vehicle collision. The collision information detection sensor 32 is a sensor capable of detecting (measuring) distance, speed, and acceleration of a collision object (another vehicle, object, pedestrian or the like) relative to the subject vehicle and also detecting (measuring) accelerations or the like in three-axial (X-axis, Y-axis, and Z-axis) directions acting on the subject vehicle. The collision information detection sensor 32 may be composed of a single detection sensor or a combination of plural detection sensors. Specifically, millimeter wave radar, laser radar, acceleration sensor, camera sensor and the like may be used as the collision information detection sensor 32.

The seat belt 3 is a long belt (webbing) to be used for restraining a vehicle occupant C (sometimes referred to as "driver") seated in a vehicle seat 40 as a driver's seat. The seat belt 3 corresponds to the "seat belt for occupant restraint" in embodiments of the present invention. The seat belt 3 is withdrawn from the seat belt retractor 1 fixed relative to the vehicle and extends through a shoulder guide anchor 10 provided around an area about the shoulder of the vehicle occupant C and is connected to an outer anchor 14 through a tongue 12. The shoulder guide anchor 10 has a function of holding the seat belt 3 to the area about the shoulder of the occupant C and guiding the seat belt 3. By inserting (latching) the tongue 12 to the buckle 16 fixed to the vehicle body, the seat belt 3 becomes into the state worn by the vehicle occupant C. The tongue 12 corresponds to the "tongue" in embodiments of the present invention and the buckle 16 to which the tongue 12 can be latched corresponds to the "buckle" in embodiments of the present invention.

The buckle 16 has a built-in buckle switch 16a. The buckle switch 16a detects that the tongue 12 is inserted into the buckle 16 so as to connect the seat belt to the buckle (actually, detects that the seat belt becomes into the worn state). The information detected by the buckle switch 16a is transmitted to the ECU 20 which determines whether or not the seat belt 3 is in the worn state. The buckle switch 16a corresponds to the "detection sensor for detecting that the tongue is latched to the buckle" in embodiments of the present invention.

The seat belt retractor 1 is a device capable of performing the action of winding or unwinding the seat belt 3 via a spool 5 and a motor 7 as will be described later and corresponds to the "seat belt retractor" in embodiments of the present invention. The seat belt retractor 1 is installed in an accommodating space in a B-pillar 42 of the vehicle in the embodiment shown in FIG. 1.

The ECU 20 has a function of conducting the control of the seat belt retractor 1 and other operational mechanisms based on the input signals from the input element 30 and comprises a CPU (Central processing unit), an input/output unit, a storage unit, a peripheral unit, and the like. Particularly in this embodiment, the ECU 20 controls the motor 7, as will be described later, of the seat belt retractor 1. Specifically, the ECU 20 controls the amount of current supplied to an electromagnetic coil of the motor 7 and the direction of the current supply so as to vary the rotational speed, the rotational direction, the rotational period of time, and the rotational torque (output) of a shaft of the motor 7. The ECU 20 is structured as a mechanism for controlling the driving of the motor 7 and controlling a power transmission mechanism 9, as will be described later, to switch between the state where the power of the motor 7 is transmitted to the spool 5 and the state where the power is not transmitted to the spool 5. The details will be described later. Further, the ECU 20 is also provided with a function of detecting (measuring) the current value of the motor 7 in operation. The ECU 20 corresponds to the "control mechanism" in embodiments of the present invention.

The ECU 20 may be exclusive to the seat belt retractor 1 or used not only for the seat belt retractor 1 but also for other control mechanisms for controlling driving system and/or electric system.

The spool 5 as shown in FIG. 2 is formed in a columnar or cylindrical shape of which outer periphery (seat belt contact face) functions as the wind-up surface on which the seat belt 3 is wound. The spool 5 is a member for performing the winding action and unwinding action of the seat belt 3 for occupant restraint according to the driving of the motor 7 as the "electric motor" in embodiments of the present invention. The spool 5 corresponds to the "spool" in embodiments of the present invention.

In this embodiment, the power transmission mechanism 9 is arranged between the spool 5 and the motor 7. The power transmission mechanism 9 is a mechanism capable of taking a connected state where the spool 5 and the motor 7 are connected (power transmission operation mode) and a disconnected state where the connected state is cancelled (power transmission disconnection mode). The power transmission mechanism 9 is sometimes referred to as so-called "clutch" which are composed of a combination of gears. The connected state of the power transmission mechanism 9 is a state where the power of the motor 7 is allowed to be transmitted to the spool via the power transmission mechanism 9. When the motor 7 is driven in this connected state, the power of the motor 7 is transmitted to the spool 5 via the power transmission mechanism 9. During this, the rotational speed of the motor 7 is reduced by the power transmission mechanism 9. On the other hand, in the disconnected state of the power transmission mechanism 9, the physical connection between the spool 5 and the motor 7 is cancelled so as to allow the easy unwinding (withdrawing) of the seat belt 3 from the spool 5. It should be noted that the spool 5 and the motor 7 may be directly connected without the power transmission mechanism 9 between the spool 5 and the motor 7, if required.

In this embodiment, the power transmission mechanism 9 is constructed as a so-called "single-stage clutch", but not illustrated. Accordingly, when the motor 7 is driven with a predetermined motor output in the power transmission operation mode of the power transmission mechanism 9, the rotation of the motor 7 is transmitted to the spool 5 with the rotational speed being reduced so that the spool 5 is driven to rotate with predetermined rotational torque at predetermined rotational speed.

Instead of the power transmission mechanism 9, a power transmission mechanism capable of changing the rotational torque and the rotational speed of the spool into several stages may be employed. For example, in case of a two-stage clutch capable of changing the rotational torque and the rotational speed of the spool into two stages, the power transmission mechanism can be set in a high-reduction ratio mode with relatively high rotational torque and relatively low rotational speed in order to respond to a need for winding of the seat belt onto the spool with large belt tension. On the other hand, the power transmission mechanism can be set in a low-reduction ratio mode with relatively low rotational torque and relatively high rotational speed in order to respond to a need for rapid winding of the seat belt onto the spool.

In this embodiment, the seat belt retractor 1 of this embodiment has the following seven seat belt setting modes of the seat belt 3. Based on these seat belt setting modes, the control of the motor 7 and the power transmission mechanism 9 are performed by the ECU 20.

(1) Belt Storage Mode

Belt storage mode is a mode in which the seat belt 3 is not used and fully wound onto the spool 5. In the seat belt retractor 1 in the belt storage mode, the motor 7 is not driven and the power transmission mechanism 9 is set to the power transmission disconnection mode. Therefore, only very weak belt tension is applied to the seat belt 3 and the power consumption is zero.

(2) Belt Withdrawing Mode

Belt withdrawing mode is a mode in which the seat belt 3 is withdrawn from the spool 5 so as to be worn by the occupant. The seat belt retractor 1 in the belt withdrawing mode is also set in the power transmission disconnection mode. Therefore, the seat belt 3 can be withdrawn with small force. Also in this case, the motor 7 is not driven so that the power consumption is zero.

(3) Belt Winding and Fitting Mode

Belt winding and fitting mode is a mode in which after the seat belt 3 is withdrawn and the tongue (the tongue 12 in FIG. 1) is inserted into and latched with the buckle to turn ON the buckle switch (the buckle switch 16a in FIG. 1), excessively withdrawn part of the seat belt 3 is wound in order to fit the seat belt 3 to the occupant. Alternatively, the belt winding and fitting mode is a mode in which when the occupant moves so as to withdraw a predetermined amount of the seat belt 3 from the normally worn state of the seat belt 3 (at this point, the buckle switch is in the ON state) and then the occupant returns to the original position, the withdrawn part of the seat belt 3 is wound. In the seat belt retractor 1 in the belt winding and fitting mode, the motor 7 is driven to rotate at high rotational speed in the belt winding direction and the power transmission mechanism 9 is set to the power transmission operation mode. Therefore, the seat belt 3 is rapidly wound onto the spool 5 and then the motor 7 is stopped when very weakly predetermined belt tension is generated, whereby the seat belt 3 is worn by and fitted to the occupant.

(4) Normal Wearing Mode (Comfortable Mode)

Normal wearing mode (comfortable mode) is a mode in which the occupant wears the seat belt 3 in the normal state after the belt winding and fitting mode is terminated. In the seat belt retractor 1 in the normal wearing mode, the motor 7 is not driven and the power transmission mechanism 9 is set in the power transmission disconnection mode. Therefore, only very weak belt tension is applied to the seat belt 3 so that the vehicle occupant can wear the seat belt 3 without any stress. In addition, the power consumption is zero.

(5) Warning Mode

Warning mode is a mode in which when the system detects dozing of the driver during running or detects an obstacle around the vehicle when the seat belt is in the normal wearing mode during running, the seat belt 3 is wound repeatedly predetermined times so as to warn the driver. In the seat belt retractor 1 in the warning mode, the motor 7 is controlled to be driven repeatedly. Therefore, the operation of applying relatively strong belt tension (which is weaker than that of the belt tension during the emergency mode as will be described later) and very weak belt tension onto the seat belt 3 is alternately repeated, thereby drawing the driver's attention to the dozing and the obstacle around the vehicle. The detailed process of the control in the aforementioned "warning mode" will be described later.

(6) Emergency Mode

Emergency mode is a mode which is set when the vehicle is extremely likely to have a collision with an obstacle or the like during running in the normal wearing mode or following the aforementioned warning mode. In the seat belt retractor 1 in the emergency mode, the power transmission mechanism 9 is set in the power transmission operation mode and the motor 7 is controlled to rotate at high rotational speed with high rotational torque in the belt winding direction. Therefore, the motor 7 is stopped when predetermined extremely strong belt tension is generated on the seat belt 3 after the seat belt 3 is rapidly wound onto the spool 5, thereby securely restraining the vehicle occupant with the seat belt 3.

(7) Belt Winding and Storing Mode

Belt winding and storing mode is a mode for fully winding up the seat belt 3 such that the seat belt 3 becomes into the storage state when the tongue (the tongue 12 in FIG. 1) is released from the buckle for canceling the wearing of the seat belt 3 so that the buckle switch (the buckle switch 16a in FIG. 1) becomes OFF. In the seat belt retractor 1 in the belt winding and storing mode, the power transmission mechanism 9 is set to the power transmission operation mode and the motor 7 is controlled to rotate in the belt winding direction. Accordingly, the withdrawn seat belt 3 is promptly wound onto the spool 5. Thus, the motor 7 is stopped when the seat belt 3 is fully wound and a predetermined belt tension which is very weak is developed, whereby the seat belt 3 becomes to the belt storage mode in which the aforementioned very weak belt tension is applied to the seat belt 3.

With respect to the control of the seat belt retractor 1 having the aforementioned structure, the detailed process of the control in the aforementioned "warning mode" will be described in detail with reference to FIG. 3 through FIG. 5. The control in the seat belt retractor 1 is conducted by the ECU 20 as shown in FIG. 1 and FIG. 2.

Figure 3:
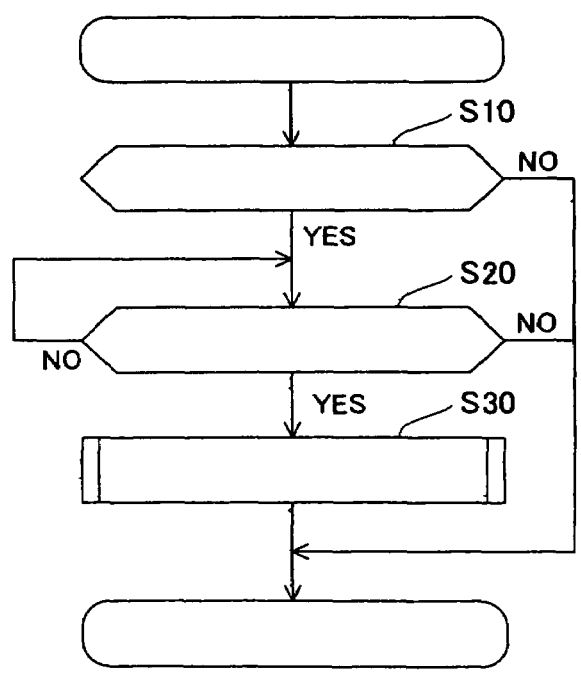
FIG. 3 is a flow chart of the warning control process relating to the warning mode of the seat belt retractor according to the embodiment.

FIG. 3 is a flow chart of the warning control process relating to the warning mode of the seat belt retractor 1 according to the embodiment.

In the warning control process shown in FIG. 3, in step S10, it is determined whether or not the seat belt is worn. Specifically, when the buckle switch 16a as shown in FIG. 1 detects that the tongue 12 is inserted and latched to the buckle 16, it is determined that the seat belt is worn. When the buckle switch 16a detects that the latching of the tongue 12 is cancelled, it is determined that the wearing of the seat belt is cancelled.

When it is determined that the seat belt is worn in step S10 (YES in step S10), the process proceeds to step S20. On the other hand, when it is determined that the wearing of the seat belt is cancelled in step S10 (NO in step S10), the warning control process is terminated without any action.

In step S20 shown in FIG. 3, it is determined whether or not the warning condition is satisfied. Specifically, when it is determined, based on information detected by the collision information detection sensor 32 in FIG. 1, that an obstacle (another vehicle, object, pedestrian or the like) around the vehicle exists within a predetermined range or that the subject vehicle is highly likely to collide with the obstacle, or when it is determined, based on information detected by a sensor for detecting the tension acting on the seat belt, that the driver dozes, it is determined that the warning condition is satisfied.

When it is determined that the warning condition is satisfied in step S20 (YES in step S20), the process proceeds to step S30 where the seat belt winding control is conducted and then the warning control process is terminated. On the other hand, when it is determined that the warning condition is not satisfied in step S20 (NO in step S20), the warning control process is terminated without any action.

In step S30 shown in FIG. 3, the seat belt winding control in the warning mode is conducted. In the seat belt winding control, the motor 7 is controlled to repeat the action of increasing and decreasing the tension acting on the seat belt 3 (temporarily increasing the tension) a plurality of times, thereby warning the vehicle occupant (driver). This control corresponds to "the electric motor is controlled to repeat an action of increasing and decreasing the tension acting on the seat belt via the spool a plurality of times . . . so as to surely warn a vehicle occupant who wears the seat belt" in embodiments of the present invention.

By the way, when conducting the warning to the vehicle occupant by the aforementioned winding action of the seat belt 3, it is difficult to conduct this motor control to exactly increase the seat belt tension actually acting on the vehicle occupant to the predetermined target value. As a comparative example, FIG. 6 shows changes with time in seat belt tension (input) which is set to repeatedly provide a constant target tension Ta for a predetermined period of time ($\Delta t$) and changes with time in seat belt tension (output) actually acting on the vehicle occupant. As shown in FIG. 6, if the action increasing the seat belt tension a plurality of times (three times in FIG. 6) is set such that the wave indicating the changes with time in seat belt tension is a rectangular wave (square wave), the rising of tension at the initial stage of each action is significantly suppressed.

Therefore, this embodiment employs a control method of bringing the tension at the initial stage of each action close to the predetermined target tension Ta as exactly as possible by devising the setting of the seat belt tension (input).

FIG. 4 shows changes with time in seat belt tension (input) and changes with time in seat belt tension (output) actually acting on the vehicle occupant according to this embodiment.

As shown in FIG. 4, this embodiment employs a control mode in which the motor 7 is controlled according to such a setting that the tension at the initial stage of each action overshoots the predetermined target tension Ta to reach a tension Tb. With regard to the overshoot, the curve indicating changes with time in the preset tension is adapted to have an extremely value (tension Tb), which slightly exceeds the target value Ta, at the initial stage of each action. Specifically, the belt tension (input) is increased to the tension Tb, higher than the target tension Ta, at time points t1, t3, and t5 and is then gradually decreased to the target tension Ta until time points t2, t4, and t6. This control corresponds to "the electric motor is controlled . . . according to a setting that the tension at the initial stage of each action overshoots a predetermined target tension" in embodiments of the present invention. This control mode is achieved by changing the current value (sometimes referred to as "control current value") and/or the voltage value (sometimes referred to as "applied voltage value") of the motor 7 to control the motor output so as to set the speed and/or acceleration of winding of the seat belt 3 to desired level.

According to the aforementioned control method, as shown in the lower graph of FIG. 4, the rising of tension at the initial stage of each of the actions of plural times (three times in FIG. 4) for increasing the seat belt tension can be increased than that of the comparative example which is shown by two-dot chain line, thereby bringing the tension at the initial stage of each action close to the predetermined target tension Ta as exactly as possible.

The setting tensions Ta and Tb used in the control may be suitably set according to a result of judgment of the body size or the clothes of the vehicle occupant.

With regard to the setting for making the seat belt tension (input) overshooting the target tension, a variety of settings may be used, if required. For example, instead of the setting as shown in the upper graph of FIG. 4, a setting of another embodiment as shown in FIG. 5 may be employed. In this setting, the belt tension (input) is increased to the tension Tb, higher than the target tension Ta, at time points t1, t3, and t5 and is then decreased stepwise to the target tension Ta until time points t2, t4, and t6. Also by this control, the tension at the initial stage of each action can be raised as shown in the lower graph of FIG. 4.

Figure 5:
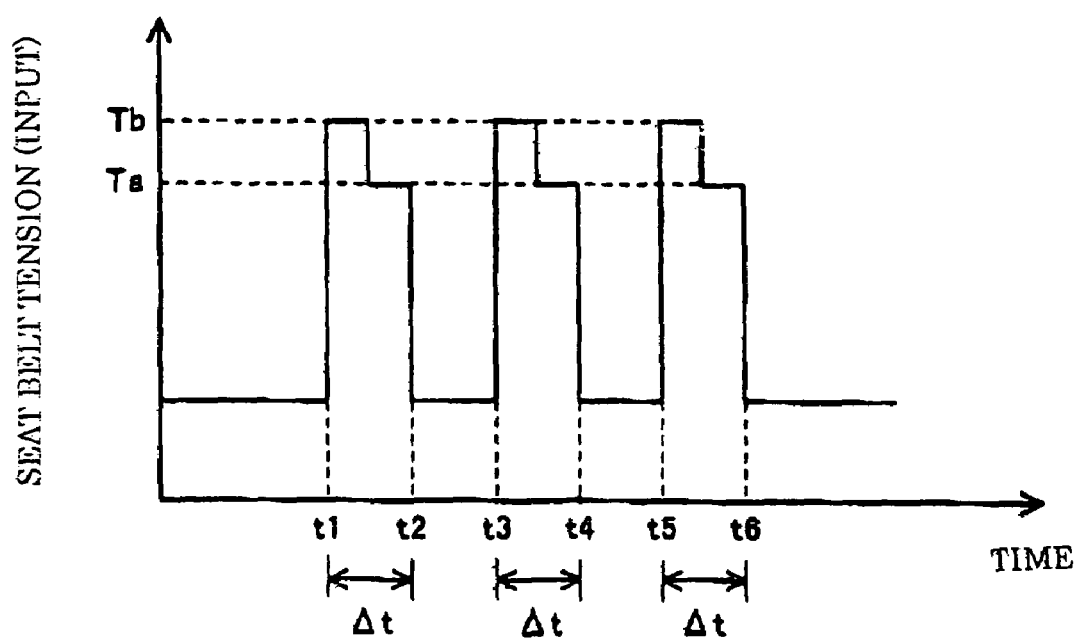
FIG. 5 is a graph showing changes with time in seat belt tension (input) set according to another embodiment of the warning control process.

According to the seat belt retractor 1 of this embodiment as described in the above, the warning control process shown in FIG. 3 is conducted by the setting as shown in FIG. 4 or FIG. 5, thereby ensuring that the vehicle occupant is aware of warning by seat belt 3. This can urge the driver to take operation required for avoiding a vehicle collision and call the vehicle occupant's attention when the vehicle occupant dozes. Though shown in either of FIG. 4 and FIG. 5 is a case where the action increasing and decreasing the tension acting on the seat belt 3 (temporarily increasing the tension) is repeated three times, the present invention may suitably employ a setting in which the action is repeated twice or a setting in which the action is repeated four times or more.

In this embodiment, the warning control process shown in FIG. 3 is followed by such a control that when it is determined, based on information detected by the collision information detection sensor 32, that the subject vehicle is highly likely to collide with the obstacle or the like, the process proceeds to the aforementioned emergency mode. In the emergency mode, the motor 7 is stopped when predetermined extremely strong belt tension is finally generated on the seat belt 3, thereby securely restraining the vehicle occupant with the seat belt 3.

Figure 7:
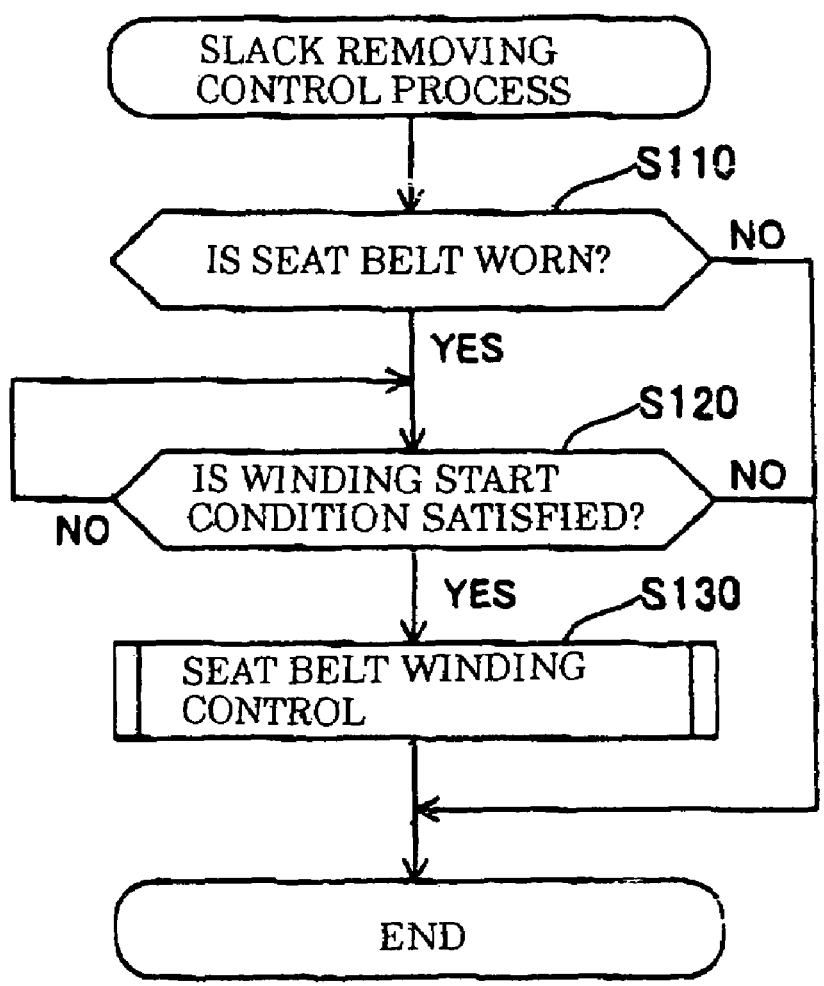
FIG. 7 is a flow chart of the slack removing control process relating to the belt winding and fitting mode of the seat belt retractor according to an embodiment.

FIG. 7 is a flow chart of the slack removing control process relating to the belt winding and fitting mode of the seat belt retractor 1 according to the embodiment.

In the retractor control process shown in FIG. 7, in step S110, it is determined whether or not the seat belt is worn. Specifically, when the buckle switch 16a as shown in FIG. 1 detects that the tongue 12 is inserted and latched to the buckle 16, it is determined that the seat belt is worn. When the buckle switch 16a detects that the latching of the tongue 12 is cancelled, it is determined that the wearing of the seat belt is cancelled.

When it is determined that the seat belt is worn in step S110 (YES in step S110), the process proceeds to step S120. On the other hand, when it is determined that the wearing of the seat belt is cancelled in step S110 (NO in step S110), the slack removing control process is terminated without any action.

In step S120 shown in FIG. 7, it is determined whether or not the winding start condition has been satisfied (or is satisfied). Specifically, when it is determined, based on information detected by a sensor for detecting change in tension acting on the seat belt 3, that the seat belt 3 has been kept in unwound state or that the seat belt 3 is kept in unwound state, it is determined that the winding start condition has been satisfied (or is satisfied).

When it is determined that the winding start condition has been satisfied (or is satisfied) in step S120 (YES in step S120), the process proceeds to step S130 where the seat belt winding control is conducted and then the slack removing control process is terminated. On the other hand, when it is determined that the winding start condition is not satisfied in step S120 (NO in step S120), the slack removing control process is terminated without any action.

In step S130 shown in FIG. 7, the seat belt winding control in the belt winding and fitting mode is conducted. In the seat belt winding control, the motor 7 is controlled to perform the action of increasing and decreasing the tension acting on the seat belt 3 (temporarily increasing the tension), thereby winding up the seat belt 3 which has been excessively unwound from the spool 5.

Figure 11A:
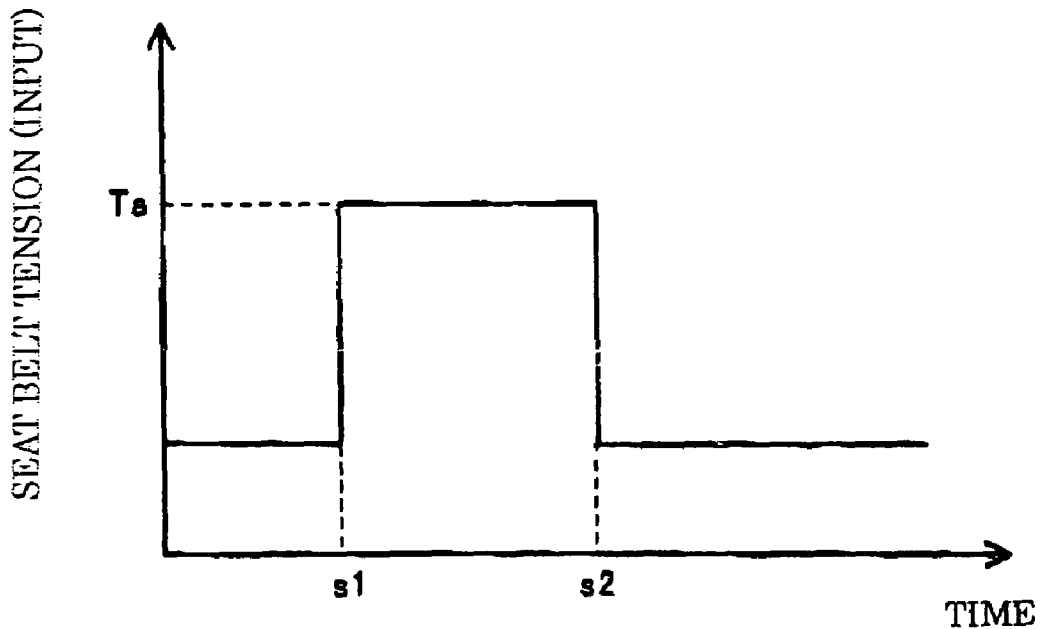
FIGS. 11($a$) and 11($b$) are graphs showing changes with time in seat belt tension actually acting on a vehicle occupant set according to a comparative example of the slack removing control process, in which FIG. 11($a$) illustrates input seat belt tension and FIG. 11($b$) illustrates output seat belt tension.
Figure 11B:
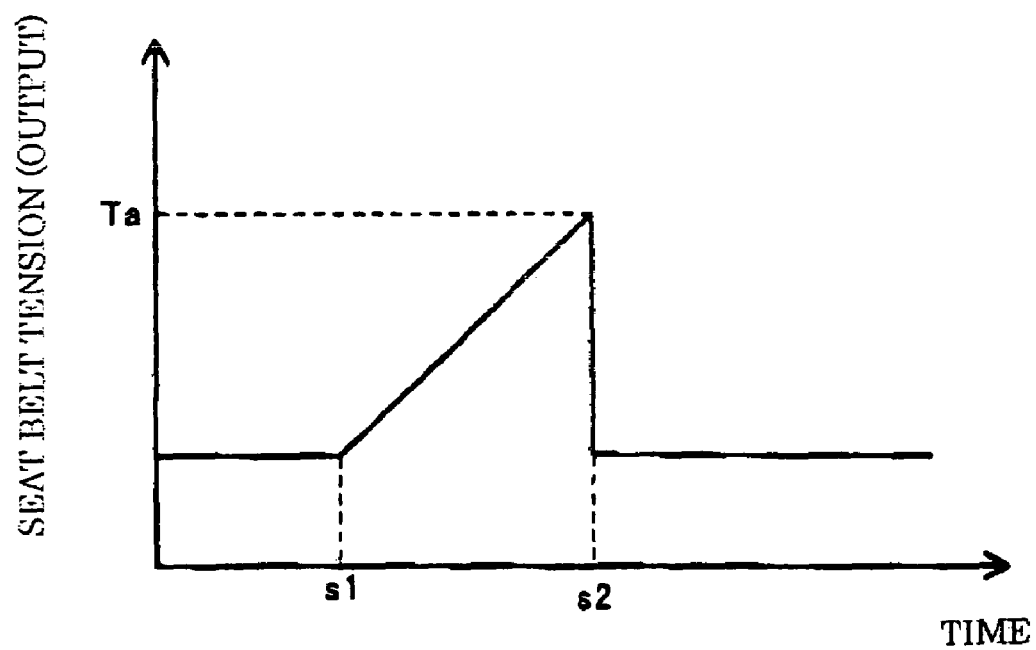

By the way, for removing the slack of the seat belt 3 by the aforementioned winding action, it is required to increase the seat belt tension. If the seat belt tension is simply increased without any particular arrangement, the slack of the seat belt can be removed, but the restraining feeling of the vehicle occupant caused by the seat belt is increased. As a comparative example, FIG. 11 shows changes with time in seat belt tension (input) which is set to provide a constant target tension Ta for a predetermined period of time and changes with time in seat belt tension (output) actually acting on the vehicle occupant. As shown in FIG. 11, if the action increasing the seat belt tension is set such that the wave indicating the changes with time in seat belt tension is a rectangular wave (square wave), the rising of tension at the initial stage of the action is significantly sudden, leading to the sudden tightness to the vehicle occupant.

Therefore, this embodiment employs a control method of controlling the rising of tension at the initial stage of the action of increasing the seat belt tension as soft as possible by devising the setting of the seat belt tension (input).

FIG. 8 shows changes with time in seat belt tension (input) and changes with time in seat belt tension (output) actually acting on the vehicle occupant according to this embodiment.

This embodiment as shown in FIG. 8 employs a control mode in which the motor 7 is controlled to be driven according to such a setting that, at the initial stage of the action of increasing the seat belt tension, the tension increasing rate until the seat belt tension reaches the target tension Ta is lower than a predetermined criterion value of restraining force. Specifically, the inclination L2 of rising curve of the seat belt tension from time s1 to time s2 in the upper graph of FIG. 8 is adapted to be gentler than the inclination L1 of the reference line corresponding to the rising of the seat belt tension in the upper graph of FIG. 11. This control mode is achieved by changing the current value (sometimes referred to as "control current value") and/or the voltage value (sometimes referred to as "applied voltage value") of the motor 7 to control the motor output so as to set the speed and/or acceleration of winding of the seat belt 3 to desired level.

According to the aforementioned control method, as shown in the lower graph of FIG. 8, a rising curve L3 of seat belt tension in which the rising of tension at the initial stage of the action as the slack removing action of increasing the seat belt tension is gentle is formed. Therefore, the restraining feeling of the vehicle occupant caused by the seat belt 3 can be controlled to be as little as possible.

The setting tensions Ta used in the control may be suitably set according to a result of judgment of the body size or the clothes of the vehicle occupant.

With regard to the setting for making the rising rate of tension until the seat belt tension reaches the target tension at the initial stage of the seat belt winding action to be lower than the predetermined criterion value of restraining force, a variety of settings may be used, if required. For example, instead of the setting as shown in the upper graph of FIG. 8, a setting of another embodiment as shown in FIG. 9 or FIG. 10 may be employed.

Figure 9:
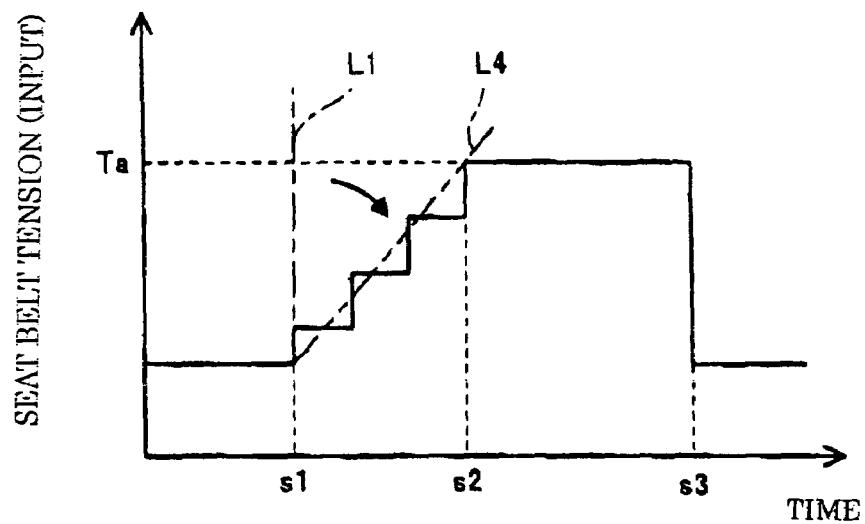
FIG. 9 is a graph showing changes with time in seat belt tension (input) set according to another embodiment of the slack removing control process.

In the embodiment shown in FIG. 9, the seat belt tension is increased stepwise to the target tension Ta so that the average inclination L4 of a rising curve of seat belt tension from time s1 to time s2 is gentler than the inclination L1 of the reference line corresponding to the rising of the seat belt tension shown in the upper graph of FIG. 11. In the embodiment shown in FIG. 10, the seat belt tension is increased continuously (in a curved line) to the target tension Ta so that the average inclination L5 of a rising curve of seat belt tension from time s1 to time s2 is gentler than the inclination L1 of the reference line corresponding to the rising of the seat belt tension shown in the upper graph of FIG. 11. By either of these settings, as shown in the lower graph of FIG. 8, a rising curve L3 of seat belt tension in which the rising of tension at the initial stage of the action as the slack removing action of increasing the seat belt tension is gentle is formed. Therefore, the restraining feeling of the vehicle occupant caused by the seat belt 3 can be controlled to be as little as possible.

Figure 10:
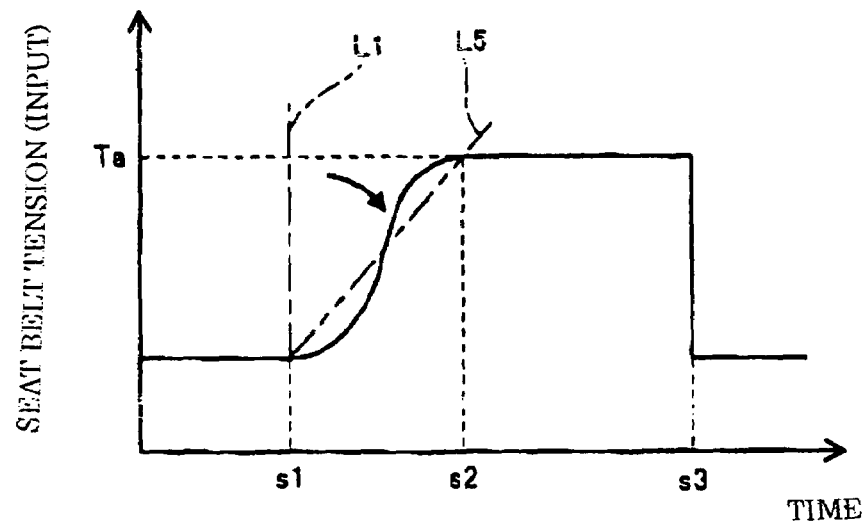
FIG. 10 is a graph showing changes with time in seat belt tension (input) set according to another embodiment of the slack removing control process.

According to the seat belt retractor 1 of this embodiment, the slack removing control process shown in FIG. 7 is conducted according to any one of the settings as shown in FIG. 8 through FIG. 10, thereby ensuring the removal of slack of the seat belt and minimizing the increase in restraining feeling of the vehicle occupant caused by the seat belt 3.

The present invention is not limited to the aforementioned embodiments, so various variations and modifications may be made. For example, the following embodiments as variations of the aforementioned embodiments may be carried out.

The above embodiments have been described with regard to the seat belt retractor 1 to be installed in an automobile, the seat belt retractor can be adapted to seat belt apparatuses to be installed in a vehicle for transfer of occupant(s) such as an automobile, aircraft, boat, train, bus and the like.

Japan Priority Application 2005-228610, filed Aug. 5, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor to be installed in a vehicle, comprising:
an electric motor configured to drive a spool;
wherein the spool is configured to wind and unwind a seat belt for restraining a vehicle occupant; and
a controller configured to control the electric motor,
wherein the controller is configured to control the spool via a current value and/or voltage value provided to the electric motor to provide a tension acting on the seat belt that is increased to a predetermined target tension and decreased a plurality of times in order to warn a vehicle occupant wearing the seat belt,
wherein the controller is configured to provide an initial current value and/or voltage value signal to the electric motor that corresponds to a second target tension that is greater than the predetermined target tension when the tension acting on the seat belt is initially increased,
wherein the second target tension is based upon a characteristic of the vehicle occupant.

2. The seat belt retractor according to claim 1, further comprising a power transmission mechanism arranged between the electric motor and the spool to selectively connect or disconnect the electric motor and the spool.

3. The seat belt retractor according to claim 1, wherein the second target tension is based upon a body size of the vehicle occupant or upon clothes of the vehicle occupant.

4. A seat belt apparatus to be installed in a vehicle, comprising:
a seat belt for occupant restraint which can be worn by a vehicle occupant;
an electric motor;
a spool driven by the electric motor, wherein the spool is capable of winding and unwinding the seat belt according to the driving of the electric motor;
a controller configured to control the electric motor;
a buckle fixed to the vehicle;
a tongue which is attached to the seat belt and is configured to be latched to the buckle when the seat belt is worn; and
a detection sensor configured to detect that the tongue is latched to the buckle,
wherein when the detection sensor detects that the seat belt is worn by the vehicle occupant, the controller is configured to control the spool via a current value and/or voltage value provided to the electric motor to provide a tension acting on the seat belt that is increased to a predetermined target tension and decreased a plurality of times in order to warn a vehicle occupant wearing the seat belt,
wherein the controller is configured to provide an initial current value and/or voltage value signal to the electric motor that corresponds to a second target tension that is greater than the predetermined target tension when the tension acting on the seat belt is initially increased,
wherein the second target tension is based upon a characteristic of the vehicle occupant.

5. The seat belt apparatus according to claim 4, further comprising a power transmission mechanism arranged between the electric motor and the spool to selectively connect or disconnect the electric motor and the spool.

6. The seat belt apparatus according to claim 4, wherein when the retractor is in a warning mode to warn a vehicle occupant, the electric motor is configured to repeatedly wind and unwind the seat belt a predetermined number of times between a warning tension and a weak tension.

7. The seat belt apparatus according to claim 6, wherein the warning mode occurs when an obstacle is detected or a vehicle driver is detected to be asleep.

8. The seat belt apparatus according to claim 6, wherein an emergency mode occurs when a collision with an obstacle is detected, and in the emergency mode the electric motor is configured to stop when a predetermined amount of emergency tension is generated on the seat belt after the seat belt is wound onto the spool.

9. The seat belt apparatus according to claim 8, wherein the emergency tension is greater than the warning tension.

10. The seat belt apparatus according to claim 4, wherein the second target tension is based upon a body size of the vehicle occupant or upon clothes of the vehicle occupant.

11. A vehicle, comprising:
seat belt apparatus accommodated in an accommodating space,
wherein the seat belt apparatus includes:
a seat belt for occupant restraint which can be worn by a vehicle occupant;
an electric motor configured to drive a spool which is capable of winding and unwinding the seat belt;
a controller configured to control the electric motor;
a buckle fixed to the vehicle;
a tongue which is attached to the seat belt and is latched to the buckle when the seat belt is worn; and
a detection sensor for detecting that the tongue is latched to the buckle;
wherein when the detection sensor detects that the tongue is latched, the controller is configured to control the spool via a current value and/or voltage value provided to the electric motor to provide a tension acting on the seat belt that is increased to a predetermined target tension and decreased a plurality of times in order to warn a vehicle occupant wearing the seat belt,
wherein the controller is configured to provide an initial current value and/or voltage value signal to the electric motor that corresponds to a second target tension that is greater than the predetermined target tension when the tension acting on the seat belt is initially increased,
wherein the second target tension is based upon a characteristic of the vehicle occupant.

12. The vehicle according to claim 11, wherein the accommodating space is a B-pillar of the vehicle.

13. The vehicle according to claim 11, further comprising a power transmission mechanism arranged between the electric motor and the spool to selectively connect or disconnect the electric motor and the spool.

14. The vehicle according to claim 11, wherein when the retractor is in a warning mode to warn a vehicle occupant, the electric motor is configured to repeatedly wind and unwind the seat belt a predetermined number of times between a warning tension and a weak tension.

15. The vehicle according to claim 14, wherein the warning mode occurs when an obstacle is detected or a vehicle driver is detected to be asleep.

16. The vehicle according to claim 14, wherein an emergency mode occurs when a collision with an obstacle is detected, and in the emergency mode the electric motor is configured to stop when a predetermined amount of emergency tension is generated on the seat belt after the seat belt is wound onto the spool.

17. The vehicle according to claim 16, wherein the emergency tension is greater than the warning tension.

18. The vehicle according to claim 11, wherein the second target tension is based upon a body size of the vehicle occupant or upon clothes of the vehicle occupant.

* * * * *